United States Patent [19]
Grimm

[11] Patent Number: 4,798,024
[45] Date of Patent: Jan. 17, 1989

[54] METHOD AND APPARATUS FOR DEBURRING THE INNER EDGE OF PART OF A WORKPIECE

[75] Inventor: Hans Grimm, Esslingen, Fed. Rep. of Germany

[73] Assignee: Maschinenfabrik Gehring Gesellshaft mit beschränkter Haftung & Co. Kommanditgesellschaft, Ostfildern, Fed. Rep. of Germany

[21] Appl. No.: 5,349

[22] Filed: Jan. 14, 1987

Related U.S. Application Data

[63] Continuation of Ser. No. 742,296, Jun. 27, 1985, abandoned.

[30] Foreign Application Priority Data

Jul. 6, 1984 [DE] Fed. Rep. of Germany ....... 3424918

[51] Int. Cl.$^4$ ............................................... B24B 9/00
[52] U.S. Cl. ....................................... 51/33 R; 51/90; 51/58; 51/361
[58] Field of Search .............. 51/33 R, 90, 360, 361, 51/DIG. 5, 263, 359, 71, 726, 58

[56] References Cited

U.S. PATENT DOCUMENTS 807,193 12/1905 Nichols ................................... 51/90
960,188 5/1910 Nichols ............................... 51/33 R

OTHER PUBLICATIONS

Precision Surface Grinding, Delmar Publishers, Inc., Albany, NY, copyright 1964, p. 148, Appendix A, Definition of "Burring".

Primary Examiner—Frederick R. Schmidt
Assistant Examiner—Maurina Rachuba
Attorney, Agent, or Firm—Becker & Becker, Inc.

[57] ABSTRACT

A method and apparatus for deburring the inner edge of the bore of a workpiece. A tool is introduced into the bore, is rotated at high speed, and has a wobbling movement imparted thereto. Alternatively, the tool can be rotated while a wobbling movement is imparted to the workpiece. The tool is embodied as a grinding rod which is held by a grinder unit which is drivingly connected with an eccentric drive. The grinder unit is preferably pivotable in all directions. During operation, the tool or the workpiece describes, in the bore of the workpiece, a wobbling movement having a circular path which is concentric to the axis of the bore, and having a diameter which increases in the direction toward the free end of the bore. The burr which is to be worked is thus very precisely removed in a simple manner without the danger that the burr is moved into the bore. Furthermore, the tool is embodied in a simple manner, so that it has a long service life.

7 Claims, 1 Drawing Sheet

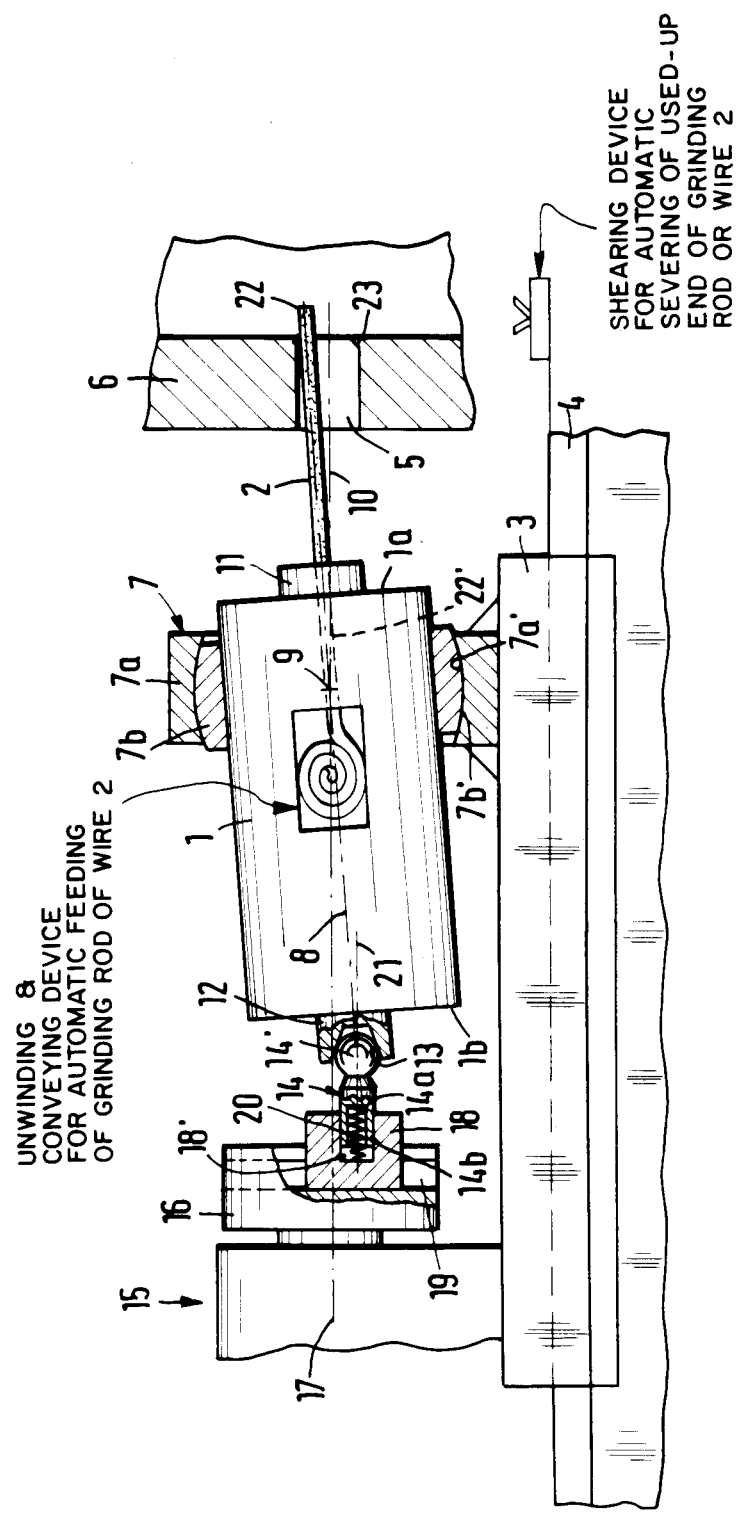

METHOD AND APPARATUS FOR DEBURRING THE INNER EDGE OF PART OF A WORKPIECE

This is a continuation application of parent U.S. patent application Ser. No. 742,296-Grimm filed June 27, 1985, now abandoned.

BACKGROUND OF THE INVENTION

1. Field of the Invention

The present invention relates to a method and apparatus for deburring the inner edge of a bore or the like of a workpiece, and includes the steps of introducing a tool into the bore, and then moving the tool in the bore over the burr which is to be removed.

2. Description of the Prior Art

Burrs are frequently found along the edges of bores. With the heretofore known methods and apparatus, these burrs could often not be satisfactorily removed. This is particularly true in those cases in which the burrs are not very accessible, for example along that edge of a bore of a workpiece which opens into a transverse bore. To remove such burrs, brush-like tools were used which were moved through the bore, thereby knocking off the burr. However, the burr can, in this way, easily be brushed into the interior of the transverse bore, where it can cause even greater problems than it did in the bore itself.

In order to avoid this drawback, tools were also used which had a spring-loaded expanding device. These tools have a head which is provided with a grinding surface, and which are spread apart by a spring which forms a forward shaft part. These tools are introduced into the bore until they engage the burr which is to be removed from behind. The tool is thereupon retracted from the bore, thus removing the burr and drawing it into the interior of the bore.

Due to the small grinding surface of their heads, these heretofore known tools only last a relatively short period of time, which is a particularly significant drawback with small tools which are used to remove burrs from bores having small diameters. It has also been discovered that the spring which is provided to spread apart the head of the tool becomes fatigued rather rapidly, so that the burr can no longer be reliably removed.

Thus, neither the brush-like tools nor the tools which are spread apart are suitable for use in a mass production operation.

An object of the present invention is to provide a method and apparatus of the aforementioned general type with which burrs can be reliably removed from bores or the like, and which assure a long service life.

BRIEF DESCRIPTION OF THE DRAWING

This object, and other objects and advantages of the present invention, will appear more clearly from the following specification in conjunction with the accompanying drawing, which schematically illustrates one embodiment of the inventive apparatus for removing a burr from a bore of a workpiece.

SUMMARY OF THE INVENTION

The method of the present invention is characterized primarily in that the tool and/or the workpiece is rotated at high speed, and in that in addition at least one of these two parts, namely the tool and the workpiece, is operated in a tumbling or wobbling manner.

The apparatus of the present invention is characterized primarily in that the tool is a grinding rod which is held by a grinding unit which is mounted in such a way that it is pivotable in all directions, and which is drivingly connected with an eccentric drive.

As a consequence of the inventive wobbling movement, after the tool has been introduced into the workpiece bore which is to be deburred, the tool or the workpiece, pursuant to the inventive method, describes a circular path which is concentric to the axis of the bore, and the diameter of which increases in the direction toward the free end of the bore. As a result, the burr which is to be worked can be very precisely and completely removed without the danger that the burr be moved into the bore. Pursuant to the present invention, the tool can be embodied in a structurally simple manner, for example as a grinding rod, so that an expensive spreading mechanism is dispensed with, and the tool has a long service life.

Pursuant to advantageous specific features of the present invention, the tool can be rotated at high speed, and a wobbling movement and an axial travel movement can be imparted to the tool. Alternatively, the tool can be rotated at high speed, while a wobbling movement and an axial travel movement are imparted to the workpiece.

The wobbling movement of the tool and/or of the workpiece can be adapted to the magnitude of the bore edge which is to be deburred in such a way that the tool is in grinding contact with the burr which is to be removed. The wobbling movement of the tool can be of such a magnitude that it deflects slightly elastically during deburring. The tool may rest against the burr with a predetermined cutting or grinding pressure.

The tool, which may, for example, be in the form of a wire, may be unwound from a roll and supplied to a grinder unit which holds it. After a certain amount of wear has occurred, the free end of the tool may be automatically severed by means of a shearing device, and then automatically supplied.

With regard to specific embodiments of the apparatus for carrying out the inventive method, the grinder unit and the eccentric drive may be disposed on a movable carriage. The grinder unit may be mounted on the carriage by means of a joint. The pivot point of the joint may be disposed approximately in the point of intersection of the longitudinal axis of the grinder unit with the axis of the bore of the workpiece, and may also be disposed near that end face of the grinder unit which faces the workpiece.

That end of the grinder unit opposite the grinder spindle may be provided with a recess which in axial section is approximately trapezoidal shaped, and into which extends the spherical head of a driving bolt of the eccentric drive. This eccentric drive may have a rotatable member, the axis of rotation of which is aligned with the axis of the bore of the workpiece, and on which a transverse slide may be adjustably held approximately radially in a guide groove. The driving bolt may be axially guided in a recess, preferably a central blind hole, of the transverse slide. Furthermore, the driving bolt may be pressed into the recess of the grinder unit under spring pressure. One end of a spring may be supported in the blind hole of the transverse slide, while the other end of the spring projects into a recess of the driving bolt.

In the situation where the tool is a grinding wire, an unwinding and conveying device may be provided for supplying this wire to the grinder unit.

DESCRIPTION OF PREFERRED EMBODIMENTS

Referring now to the drawing in detail, the illustrated apparatus includes a grinder unit 1, which is known per se and in which is secured a tool that is in the form of a grinding rod 2. The end 22' of this tool is inserted into a bore at one end of a grinder spindle 11, where it is held with known means, such as a collet. The grinder spindle 11 is rotated at high speed by means of a non-illustrated drive turbine. The grinder unit 1 is mounted on a carriage 3 which, in a known manner, for example by means of a non-illustrated piston/cylinder unit, can be moved on a guide 4 in such a way that by displacement of the carriage 3, the grinding rod 2 can be moved into the bore 5 which is to be deburred, and which is provided in the fixedly arranged workpiece 6.

The grinder unit 1 is connected to the carriage 3 via a Cardan or spherical joint 7, which comprises an outer slide ring 7a which is rigidly mounted on the carriage 3, and an inner slide ring 7b which is mounted on the outer surface of the grinder unit 1. The glide surfaces 7a', and 7b' of the slide rings 7a, 7b are spherically curved in the longitudinal direction of the grinder spindle 11. By means of the joint 7, the grinder unit 1 can be tilted in all directions relative to the carriage 3. The joint 7 is disposed in such a way that its pivot point 9 lies in the point of intersection of the longitudinal axis 8 of the grinder unit 1 with the axis 10 of the bore 5 of the workpiece 6, and is preferably disposed near that end face 1a of the grinder unit 1 which faces the workpiece.

The grinder unit 1 is provided on that end face 1b thereof which is remote from the grinding rod 2 with a stud-like extension 12 of greatly reduced diameter. The extension 12 is provided with a recess 13 which when viewed in an axial section is trapezoidal shaped. The recess 13 widens toward the outside, i.e. in the direction away from the end face 1b, and serves to receive the spherical head 14' of the driving bolt 14 of an eccentric drive 15. The latter is rigidly mounted on the carriage 3, and is provided with a rotatable member 16, the axis of rotation 17 of which is aligned with the axis 10 of the bore 5 of the workpiece 6. The member 16 has a preferably diametrically disposed guide groove 19, in which the transverse slide 18 can be adjustably held in the radial direction by means of a known (not illustrated) adjusting means, such as a wedge gear. The transverse slide 18 has a preferably central recess 18' which is open toward the grinder unit 1, and into which projects the shaft-like end 14b of the driving bolt 14, which shaft-like end is remote from the spherical head 14'. The end 14b is similarly provided with a preferably central blind hole 14a in which is preferably disposed a compression spring 20, one end of which projects out of the blind hole 14a and rests against the bottom of the recess 18'.

During operation of the apparatus, the transverse slide 18 is positioned off-center relative to the rotatable member 16, so that in conformity with the respective distance between the axis of rotation 17 and the longitudinal axis 21 of the driving bolt 14, the latter carries out a more or less great eccentric movement during rotation of the member 16. In order to be able to adjust the desired distance between the axes 17 and 21, the driving bolt 14, along with the transverse slide 18, can be moved in the guide groove 19 of the rotatable member 16. The driving bolt 14 is axially displaceably guided in the transverse slide 18, and is pressed into the recess 13 of the grinder unit 1 by means of the compression spring 20, as a result of which the changes in length which occur during the pivoting of the grinder unit 1 about the pivot point 9 are automatically compensated for.

Prior to start-up of the apparatus, the driving bolt 14 is centrally disposed, so that its longidutinal axis 21 is aligned with the axis of rotation 17 of the rotatable member 16. Furthermore, the grinder unit 1 is held in the carriage 3 in such a way that its longitudinal axis 8 is aligned with the axis 10 of the bore 5 of the workpiece which is to be deburred. Subsequently, by moving the carriage 3, the grinding rod 2, the diameter of which is considerably less than the diameter of the bore 5 of the workpiece 6, is introduced into the bore 5 to such an extent that the free end 22 of the grinding rod 2 projects slightly beyond the burr 23 which is to be removed. The grinding rod 2 is thereupon rotated at high speed, for example 50,000 to 200,000 rpm; at the same time, the eccentric drive is activated. The member 16 then begins to rotate at a low speed, and the driving bolt 14 is shifted radially outwardly via the transverse slide 18 to the desired eccentricity. The grinder unit 1, along with the grinding rod 2, as eccentrically driven by means of the rotatable member 16 and the driving bolt 14, together provide a result whereby the grinder unit and the grinding rod 2 execute a tumbling or wobbling movement about the pivot point 9.

The magnitude of the radial displacement of the driving bolt 14 determines the magnitude of the wobbling movement. This magnitude is selected in such a way that the grinding rod 2, which rotates at high speed, comes into grinding contact with that inner edge of the bore 5 which is to be deburred, whereby the burr 23 is efficiently ground down.

During the process of deburring the edge of the burr, the grinding rod 2 is advantageously constantly moved back and forth by a small distance in the direction of the axis 10 of the bore. For this purpose, the carriage 3 is displaced by a non-illustrated travel mechanism. Especially for small bore diameters, the grinding rod 2 is preferably a spring hard steel wire, which is coated over its entire length with an abrasive or grinding material, for example diamond dust or boron nitride of a suitable granular size.

To increase the grinding pressure, the wobbling movement is increased to such an extent that when the grinding rod 2 is placed against that edge 23 of the bore 5 which is to be deburred, the grinding rod 2 deflects slightly elastically.

The above described inventive apparatus has a long service life, since the front end of the grinding rod 2, after it has been worn away due to long use, is automatically cut off by a suitable (not illustrated) shearing device, and the grinding rod is appropriately adjusted. Preferably, a grinding rod in the form of a grinding wire which is wound onto a spool is used. When necessary, this wire can be unwound from the roll by means of a known (not illustrated) unwinding and conveying device, and can be conveyed to the grinder spindle. As a result, a disturbance-free operation can be assured over a long period of time, so that the inventive apparatus is particularly suitable for a mass production operation.

In certain situations it may also be advantageous to only rotatably drive the grinding rod 2, and to impart the wobbling movement to the workpiece. In this connection, not only the grinding rod but also the workpiece can carry out the superimposed axial travel movement. However, it is also possible to rotate and tumble the workpiece 6 while the grinding rod 2 remains stationary or is rotated.

The present invention is, of course, in no way restricted to the specific disclosure of the specification and drawing, but also encompasses any modifications within the scope of the appended claims.

What I claim is:

1. A method of deburring specifically only an inner edge of a bore especially that of a small diameter transverse bore or the like of a workpiece in which burrs are rather inaccessible to be removed even with brush-like tools, including the steps of introducing a tool connected with a grinding spindle unit with a direct drive for a grinding spindle into said bore, and then moving said tool in said bore angularly over the burr which is to be removed from the inner edge of the bore without danger of such burr being brushed or moved into an interior of the transverse bore; said method comprising the steps of:

providing a grinder unit for holding said tool, unwinding said tool from a roll, and feeding said tool to said grinder unit;

rotating at least one of said tool that is a grinding rod which with the grinding spindle unit and drive embodied as a drive turbine and said workpiece operate collectively relative to each other at high speed in a predetermined range of revolutions per minute; and imparting both a wobbling movement and also an axial travel movement to at least one of said tool and said workpiece whereby the drive turbine and grinder spindle form a structural unit which is mounted universally pivotable on all sides and driven via an eccentric drive and as a consequence of said wobbling movement after the tool has been introduced into the workpiece bore which is to be deburred, at least one of said tool and said workpiece furthermore describes a circular path which is concentric to the axis of the bore and the diameter of which increases progressively in a direction toward a free end of the bore when the grinding rod describes a configuration of a truncated cone as a consequence of said wobbling movement during effectiveness in angularly deburring specifically only the inner edge of the small diameter transverse bore therewith.

2. A method according to claim 1, which includes the steps of rotating said tool at high speed, and imparting to said tool a wobbling movement and an axial reciprocating movement.

3. A method according to claim 1, which includes the steps of rotating said tool at high speed, and imparting to said workpiece a wobbling movement and an axial reciprocating movement.

4. A method according to claim 1, which includes the step of adapting said wobbling movement to the size of the bore edge which is to be deburred in such a way that said tool is in grinding contact with said burr which is to be removed.

5. A method according to claim 1, which includes the step of providing a wobbling movement of such a magnitude that said tool is deflected slightly elastically during deburring.

6. A method according to claim 1, which includes the step of resting said tool against said burr with a predetermined cutting pressure.

7. A method according to claim 1, which includes the steps of providing a shearing device, and automatically severing and supplying said tool, via said shearing device, after the free end of said tool has been worn down by a predetermined amount.

* * * * *